United States Patent [19]

Popescu et al.

[11] Patent Number: 5,610,750

[45] Date of Patent: Mar. 11, 1997

[54] OPTICAL COMMUNICATIONS TERMINAL

[75] Inventors: Alexandru F. Popescu, Lisse; Bernard Furch, Noordwijkerhout, both of Netherlands

[73] Assignee: Agence Spatiale Europeenne, Paris, France

[21] Appl. No.: 982,758

[22] PCT Filed: May 26, 1992

[86] PCT No.: PCT/EP92/01218

§ 371 Date: Mar. 8, 1993

§ 102(e) Date: Mar. 8, 1993

[87] PCT Pub. No.: WO92/22150

PCT Pub. Date: Dec. 10, 1992

[30] Foreign Application Priority Data

Jun. 4, 1991 [FR] France .................................. 91 06718

[51] Int. Cl.⁶ .......................... H04B 10/00; H04B 7/185
[52] U.S. Cl. .................... 359/172; 359/152; 359/153; 359/159; 455/12.1
[58] Field of Search ............................... 359/152, 159, 359/164, 172, 153; 455/12.1

[56] References Cited

U.S. PATENT DOCUMENTS

| | | | |
|---|---|---|---|
| 2,257,319 | 9/1941 | Williams | 359/159 |
| 2,982,859 | 5/1961 | Steinbrecher | 359/159 |
| 4,867,560 | 9/1989 | Kunitsugu | 359/159 |
| 4,933,928 | 6/1990 | Grant et al. | 359/159 |
| 5,021,643 | 6/1991 | Baciak | 250/201.9 |
| 5,030,004 | 7/1991 | Grant et al. | 359/152 |
| 5,060,304 | 10/1991 | Solinsky | 359/159 |
| 5,062,150 | 10/1991 | Swenson et al. | 359/172 |
| 5,093,563 | 3/1992 | Small et al. | 250/201.9 |
| 5,119,225 | 6/1992 | Grant et al. | 359/172 |
| 5,142,400 | 8/1992 | Solinsky | 359/159 |
| 5,218,467 | 6/1993 | Ross et al. | 359/172 |
| 5,264,955 | 11/1993 | Sakanaka et al. | 359/152 |

FOREIGN PATENT DOCUMENTS

| | | |
|---|---|---|
| 115768 | 8/1984 | European Pat. Off. . |
| 325429 | 7/1989 | European Pat. Off. . |
| 378148 | 7/1990 | European Pat. Off. . |
| 2237329 | 10/1989 | Japan .................. 359/152 |
| 9105414 | 4/1991 | WIPO . |

OTHER PUBLICATIONS

M. A. Grant, et al., "Optical Multiple Access System . . . Communications", SPIE, vol. 996, High Data Rate Atmospheric and Space Communications, 1988, pp. 42–48.

Primary Examiner—Hezron E. Williams
Assistant Examiner—Richard A. Moller
Attorney, Agent, or Firm—Ladas & Parry

[57] ABSTRACT

An assembly of telescope modules is mounted on a base so that the modules are parallel to each other. Several modules of the telescope module assembly are arranged to operate as transmit/receive modules, each of these modules being connected so as to be supplied from a separate laser module arranged to operate at an individual predetermined frequency, each laser module comprising a laser generator and a device for modulating the laser beam produced by the laser generator with a data signal, the receiver end of the transmit/receive modules being arranged so as to be connected to a signal receiver. At least one module of the telescope module assembly can be arranged to operate as an acquisition and tracking module at a predetermined frequency for adjusting the aim of the said assembly of modules. This device is intended to be carried on satellites for providing intersatellite communication links.

7 Claims, 3 Drawing Sheets

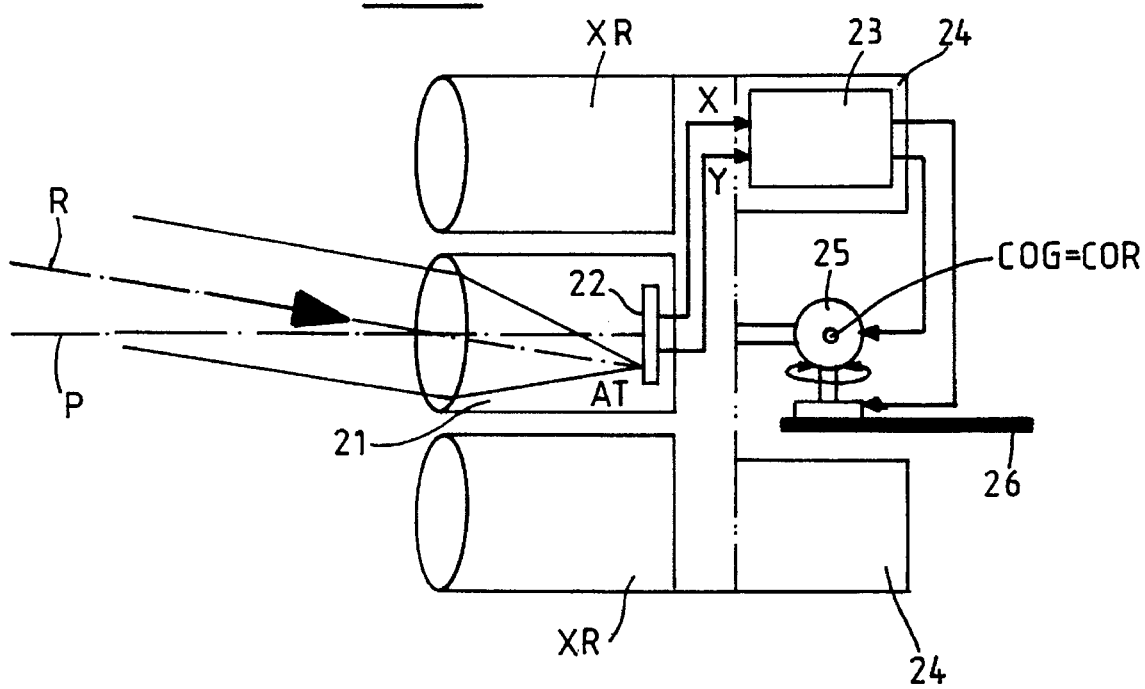

OPTICAL COMMUNICATIONS TERMINAL

FIELD OF THE INVENTION

The present invention relates to intersatellite communications systems and in particular to a mobile communications terminal to be carried on board a satellite for providing intersatellite communication links.

BACKGROUND OF THE INVENTION

Laser based intersatellite communications systems have become attractive over the last decade, as lasers provide reasonable high output power emission in the fundamental spatial mode, and single frequency operation. The high antenna gain achievable at optical frequencies makes it possible to reduce the antenna diameter of the communications terminals and allows transmission at high data rates.

The most interesting scenario today is the interorbit link (IOL), where a low-earth-orbiting satellite (LEO) has to transmit high-rate data—up to several 100 Mbit/s—to a satellite in geosynchroneous orbit (GEO) serving as a data relay to a ground station. The data rate of the GEO-to-LEO link is much lower, in the range about several Mbit/s. The link distance is up to 45000 km. In order to compete successfully with microwave and millimeter wave systems, the optical terminals on the LEO spacecraft (user) have to be low-mass (<50 kg) and low-cost. Moreover, it is desirable to operate a communication system having a mass which correspond to the required link capacity, so that a reduction of the data rate goes along with an equivalent reduction in mass and cost of the user terminal.

Typically, a terminal for a laser intersatellite communications system comprises a single telescope of about 25 cm in diameter, mounted on an optical bench together with all the optical components and front-end electronics. The optical bench, together with the telescope, can be moved under the control of a coarse pointing mechanism. The beam aperture in such an optical package is about 6 microradian.

For a beam divergence below 10 microradian, however, the pointing requirements become extremely stringent calling for prohibitively complex hardware and software. In practice, that leads to a limitation of the telescope diameter to some 30 cm. Consequently, the dimensions and the mass of the terminal are determined by the optical bench, the mechanical structure, the pointing mechanisms, the electronics, rather than by the dimensions of the optical antenna (telescope) itself. In other words, it results in a large and heavy terminal even though the mass of the telescope is just a fraction of the total terminal mass. Thus, a reduction of the telescope diameter would not significantly reduce the overall volume and mass, since they are mainly determined by the dimensions of the optical bench and of the coarse pointing mechanism.

Also known is a large aperture optical terminal comprising one very large single telescope (about 12 m in diameter) with a segmented sunshield (Optical Space Communication, Proccedings of the Meeting, Paris, France, Apr. 24–26, 1989). In this terminal designed by Jet Propulsion Laboratory (JPL), California Institute of Technology, Pasadena, Calif., the telescope does not operate in the diffraction limit but as a photon bucket. This terminal is very well suited for receive-only systems and is intended for use in ground stations or in low-earth-orbiting satellites. The terminal has very high volume and mass, which leads to heavy gimbals whereby pointing is made more difficult. In addition, such a terminal requires a counter-terminal having a large aperture and a wide field of view for data acquisition whereby the design of the whole optical system becomes very difficult. Finally, this known optical terminal has poor transmit performance.

Another known optical terminal is the optical multiple access communications system (OMA) proposed by British Aerospace Public Limited Company. This system comprises a GEO-platform provided with several optical heads including a small telescope. Each telescope is pointed individually and each optical head thus requires an individual tracking loop and an individual receiver, which consequently increases the overall system mass. The individual operation of the receivers limits the achievable data rate to 1 Mbits/second for 175 mW transmitted average power.

SUMMARY OF THE INVENTION

It is an object of the present invention to provide an optical communications terminal having a large effective aperture and which is capable of transmitting data at a high data rate and which has reduced volume and mass. In order to achieve the above object, this invention provides an optical communications terminal comprising a base carrying several telescope modules having a small diameter and being short in length, several telescope modules being supplied from a distinct laser module arranged to operate at an individual predetermined frequency. Each laser module comprises means for modulating the laser beam with a distinct or the same data signal. The receiver end of the telescope modules is arranged to be connected to the input of a signal receiver, e.g. through optic fibers. At least one telescope module can be set to operate as an acquisition and tracking module for adjusting the aim of said assembly of telescope modules.

The invention makes it possible to realize a wide choice of modular array configurations including any number of modules to meet quite specific system requirements. Since all the modules operate simultaneously, it is not necessary to provide for transmitter redundancy because the failure of one transmitter only reduces the emitted power but will never jeopardize the link.

By virtue of the modular arrangement according to the invention, optical terminals can be implemented which have a significantly reduced volume as compared to the state-of-the-art optical terminals while having a high isotropically equivalent radiated power. Accordingly, these terminals in accordance with this invention are suitable for being used on board low-earth-orbiting satellites (users satellites) of different types.

An optical terminal according to the invention also has a reduced weight since it does not require any fine pointing mechanism. This is especially effective in the case of a geosynchronous satellite which requires a low angular coverage only.

In addition, the reduction of the mass which has to be pointed in the terminal according to the invention, together with the mounting flexibility gained by using optical fibers for guiding the optical waves to the receiving circuitries allows these circuitries to be accommodated at any convenient location inside the satellite.

Finally, using optical fibers allows new concepts to be adopted for the pointing and tracking procedures.

BRIEF DESCRIPTION OF THE DRAWINGS

The invention will now be described in more detail, reference being made to the accompanying drawings, in which:

FIG. 5 schematically illustrates an acquisition and pointing subsystem for use in a terminal according to the invention.

DETAILED DESCRIPTION

Figure 1:
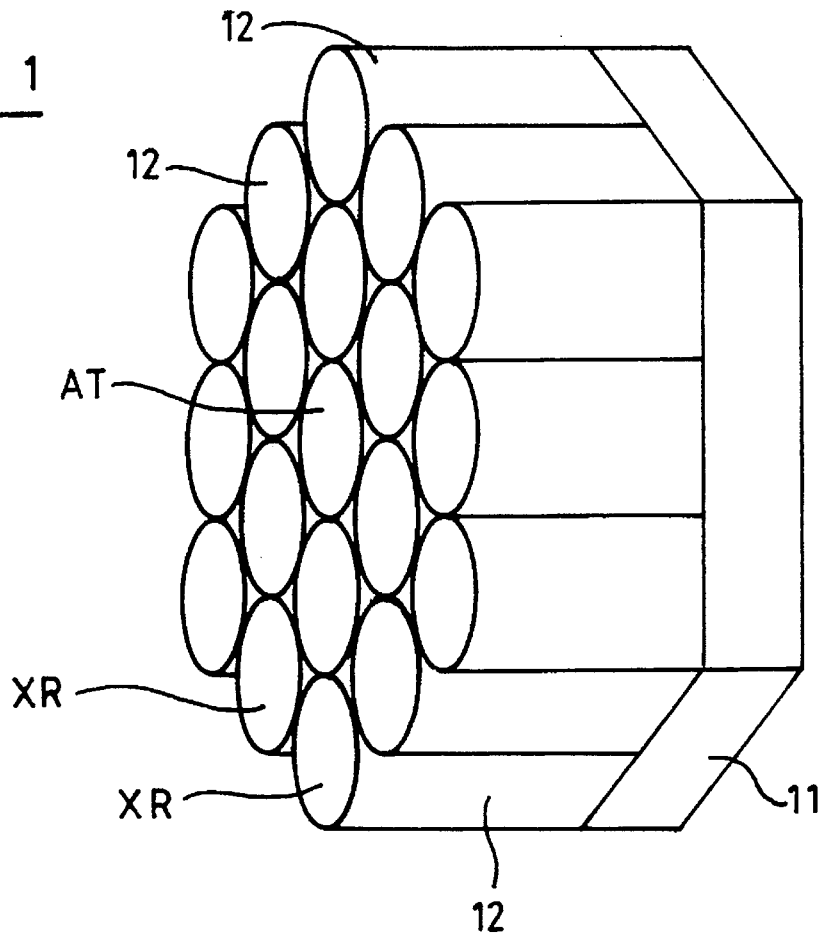
FIGS. 1 and 2 are schematic views showing two exemplary embodiments in accordance with the invention.
Figure 2:
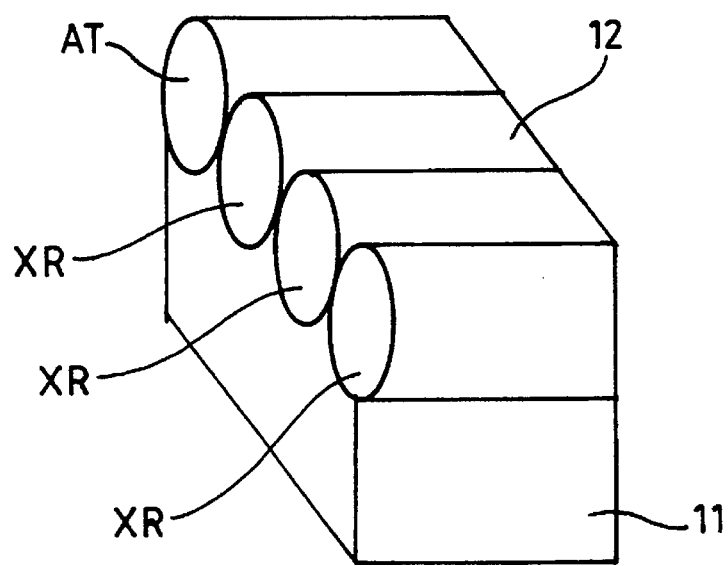

An exemplary embodiment according to the invention is represented in FIGS. 1 and 2. The optical terminal shown in FIG. 1 is intended for use on a geosynchronous orbit satellite for instance; the terminal shown in FIG. 2 is intended for use for instance on a low-earth-orbiting satellite.

Referring to FIG. 1, an optical terminal according to the invention comprises a base 11 in which are implemented the electronic and/or opto-electronic components and on the base 11 are mounted an assembly of telescope modules 12 having a small diameter and a short length, e.g. telescopes of 10 cm in diameter and 30 cm long. The telescopes 12 constitute a modular assembly in which the number of modules and the arrangement thereof can be chosen freely in accordance with the operation requirements. FIG. 1 shows a base carrying nineteen telescope modules: eighteen modules can be used for instance as data transmit/receive modules i.e. transceiver modules, (modules XR) and one module can be used for instance as an acquisition and tracking module (module AT). The assembly of modules is equivalent to an objective with a 50 cm diameter aperture.

The optical terminal shown in FIG. 2 is similar to the one shown in FIG. 1 except that the base 11 here is carrying four telescope modules 12: three modules XR can be used as transmit/receive modules and one module AT can be used as an acquisition and tracking module.

Figure 3:
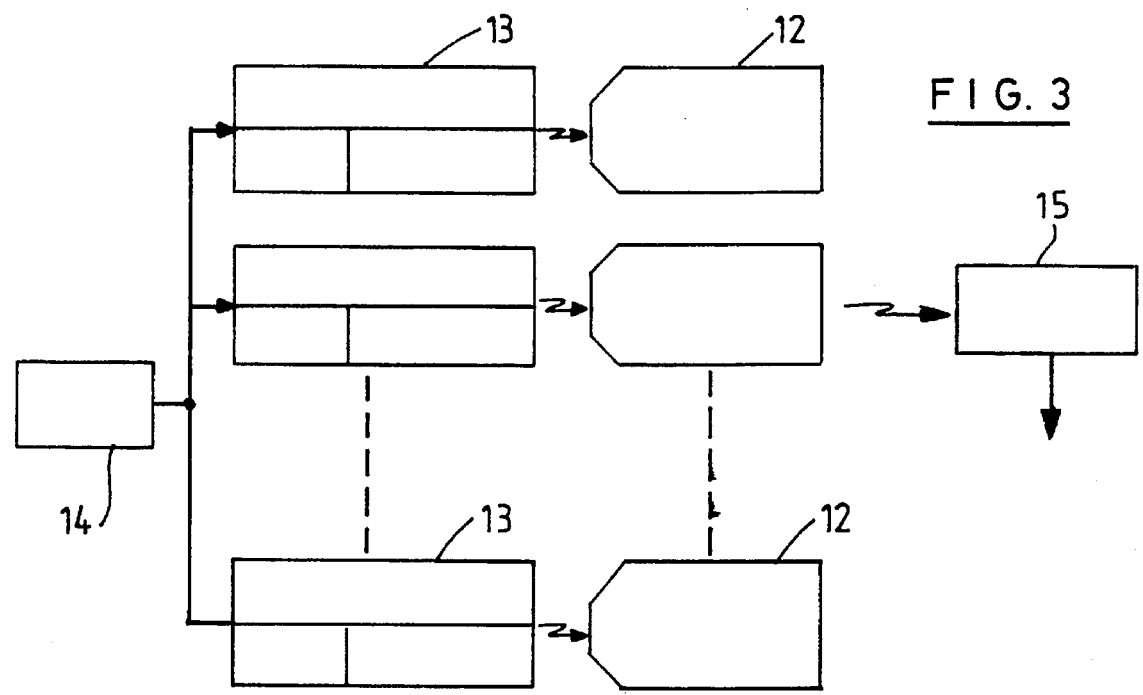
FIG. 3 is a simplified schematic diagram of a communications terminal using an optical platform according to the invention in a direct detection system.

Each telescope module 12 operates within the diffraction limit at a wavelength w1 in transmit mode and/or at a wavelength w2 in receive mode. In transmit mode each module XR is supplied with signals from an individual laser module operating at a separate predetermined frequency (see FIG. 3).

Each laser module 13 comprises a laser generator and a device (known per se) to modulate the laser beam with data signals. When the terminal is used in a direct detection system the data signals are generated at a single data source 14.

The width of the superimposed beams is determined by the divergence of the telescope modules 12. The divergence of the assembly of small telescope modules 12 of diameter d is increased by a factor of D/d as compared with the divergence of a single telescope of large diameter D. This results in a considerable relaxation of the pointing requirements for the optical terminal. Accordingly, the telescope modules do not require any active adjustment mechanism.

In receive mode, the signals received in the telescope modules XR are added and passed to a common receiver 15. In a particular embodiment, the receiving end of each module XR is coupled to an optical fiber in order to pass the received waves to the receiver 15 which may be a single photodetector for one data channel. Obviously, when several data channels are operated, a conventional demultiplexing device and several photodetectors are to be used.

Figure 4:
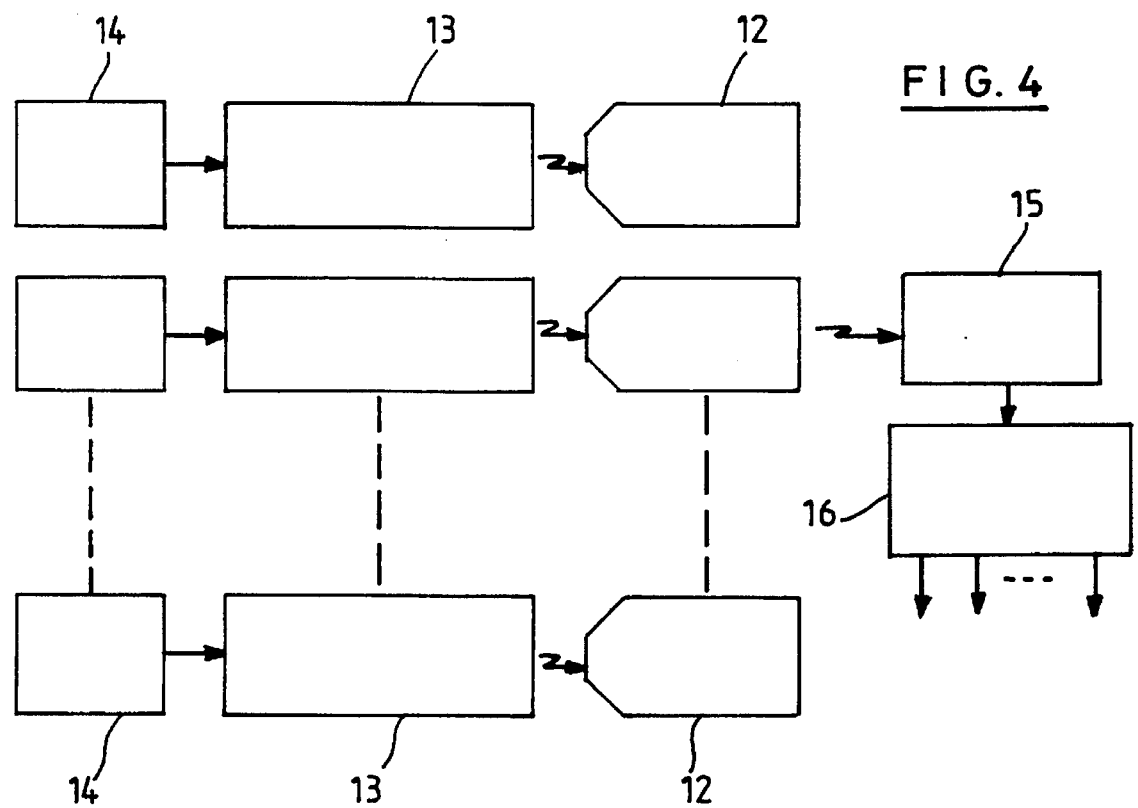
FIG. 4 is a simplified schematic diagram of a communications terminal using an optical platform according to the invention in a coherent detection system.

In the case of a coherent detection system, an individual data source 14 is connected to each laser module 13 as schematically shown in FIG. 4. At the receiving end, the outputs from the different modules XR are connected to a wavefront adjusting device (a device known per se) in order to produce a single diffraction-limited beam. In addition to a photodetector, the common receiver 15 should then include an electric IF demultiplexing device 16.

It is worthy of note that, in this case, the terminal should not include any optical polarization demultiplexing device since demultiplexing is performed within the IF electric subsystem.

For a proper operation of the receiver 15 and an undistorted extraction of the baseband signal, the individual laser modules 13 are preferably adapted to operate at frequencies which are sufficiently separated from one another, thereby to avoid interference products.

The module AT is provided with sensors for measuring the angle of incidence of the received light in order to deliver the required information for pointing the terminal platform. FIG. 5 schematically shows an acquisition and pointing subsystem in accordance with this invention. In the figure there is shown a module AT denoted by reference numeral 21, arranged between two communications modules XR. The module 21 focuses the incoming optical rays R onto a position detector 22, for instance a charge coupled detector well known to one skilled in the art. Said detector 22 produces two signals X and Y (one signal for each of the two directions x and y) representing the inclination angle of the incoming rays R relative to the axis P of the module AT. The signals X and Y are passed to a control unit 23 which is included in the electronics 24 and calculates the torques that have to be applied to the mobile assembly of the terminal in order to compensate for pointing errors. The control unit 23 directs the necessary control signals to the metors 25 serving to drive the afore-mentioned mobile assembly.

When the center of gravity (COG) and the center of rotation (COR) are coincident, the satellite platform 26 only exerts a small disturbing action to the torque of the mobile assembly of the terminal. The inertia of the mobile assembly results in the disturbing action in torque to be damped. Fast low-torque motors can be used to compensate for the residual pointing errors.

One module AT is enough to perform pointing for one terminal, but additional modules AT may be provided for redundancy purposes. These additional modules allow measurements to be performed with a view to compensate for the pointing errors, preferably by electronic image processing.

In an exemplary embodiment, optical platforms according to the invention include the following modules:

A. GEO-terminal
- 18 modules XR having 10 cm in diameter, operating at 1060 nm wavelength in receive mode (return link) and at 800 nm wavelength in transmit mode (outgoing link),
- 1 module AT having 10 cm in diameter, operating at 1060 nm wavelength in receive mode.

B. LEO-terminal (user)
- 3 modules XR having 10 cm in diameter, operating at 1060 nm wavelength in transmit mode and at 800 nm wavelength in receive mode;
- 1 module AT having 10 cm in diameter, operating at 800 nm wavelength in receive mode.

Assuming a 150 mW output power for each laser module in each LEO terminal it is possible to achieve a data rate of over 200 Mbits/s using optical platforms having less than 50 kg in weight and a reduced volume.

For a better comparison of terminal concepts it is appropriate to have a "figure of merit" (mf) defined as the ratio between the useful terminal cross-section and the volume of the terminal. With 10 cm diameter modules, a platform according to the invention has a figure of merit mf>2 while allowing a data rate of over 200 Mbits/s as mentioned earlier herein. This performance is to be compared with a figure of merit of 0.4 and a data rate of 1 Mbits/s for each optical head in a state-of-the-art OMA system described in the foregoing.

The embodiments of the invention described in the foregoing are examples given by way of illustration and the invention is nowise limited thereto. Any modification, variation and equivalent arrangement should be considered as being included within the scope of the invention.

What is claimed is:

1. An optical communications terminal of an interstatellite communication system comprising:

a plurality of laser modules, each laser module comprising a laser generator operating at an individual predetermined frequency, and modulating means for modulating a laser beam produced by the laser generator with a data signal, a base, a plurality of transceiver modules mounted on the base extending parallel to each other, each transceiver module receiving an optical signal from a respective laser module, one common signal receiver coupled to receiver ends of said plurality of transceiver modules, and at least one acquisition and tracking module extending parallel to said plurality of transceiver modules, said at least one acquisition and tracking module being mounted on said base and operating at a predetermined frequency, and means on said base connected to said at least one acquisition and tracking module for adjusting aim of said plurality of transceiver modules in concert.

2. The system according to claim 1, further comprising a common data signal source connected to the modulating means of each laser module.

3. The system according to claim 1, further comprising an individual data signal source connected to the modulating means of each laser module.

4. The system according to claim 3, further comprising means connected to the receiver ends of the transceiver modules for adjusting a wavefront phase of the received waves thereby to produce a single diffraction limited beam, said receiver being connected to an output of a wavefront phase adjusting means, and demultiplexing means connected to an output of said receiver for demultiplexing data signals carried by signals received by the transceiver modules.

5. The system according to claim 4, further comprising an optical fiber connected to the receiver end of each said transceiver module for transmitting signals received from the transceiver module to said receiver.

6. The system according to claim 1, further comprising an optical fiber connected to the receiver end of each said transceiver module for transmitting signals received from the transceiver module to said receiver.

7. The system according to claim 1, further wherein said means for adjusting aim of said transceiver modules comprises a motor-driven platform on said base supporting said transceiver modules in secured relation parallel to one another for common movement with said platform.

* * * * *